(12) United States Patent
Vincent

(10) Patent No.: US 9,170,891 B1
(45) Date of Patent: Oct. 27, 2015

(54) PREDICTIVE UPLOAD OF SNAPSHOT DATA

(75) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 174 days.

(21) Appl. No.: 13/609,089

(22) Filed: Sep. 10, 2012

(51) Int. Cl.
*G06F 11/14* (2006.01)

(52) U.S. Cl.
CPC ........ *G06F 11/1451* (2013.01); *G06F 11/1461* (2013.01)

(58) Field of Classification Search
None
See application file for complete search history.

(56) References Cited

U.S. PATENT DOCUMENTS

| | | | |
|---|---|---|---|
| 7,484,119 B2* | 1/2009 | Fisher et al. | 714/15 |
| 7,739,242 B2* | 6/2010 | Nakamura et al. | 707/649 |
| 7,934,066 B2* | 4/2011 | Mu et al. | 711/162 |
| 8,095,756 B1* | 1/2012 | Somavarapu et al. | 711/162 |
| 2006/0095659 A1* | 5/2006 | New et al. | 711/112 |
| 2007/0118577 A1* | 5/2007 | East | 707/204 |
| 2008/0201542 A1* | 8/2008 | Maruyama et al. | 711/165 |
| 2008/0294700 A1* | 11/2008 | Sugimoto | 707/200 |
| 2008/0307019 A1* | 12/2008 | Weiss et al. | 707/204 |
| 2009/0320029 A1* | 12/2009 | Kottomtharayil | 718/102 |
| 2011/0060882 A1* | 3/2011 | Efstathopoulos | 711/162 |
| 2013/0159603 A1* | 6/2013 | Whitney | 711/103 |

OTHER PUBLICATIONS

Garcia-Molina, Hector, Ullman Jeffrey D. et. al. "Database Systems: The Complete Book." Published Oct. 12, 2001.*
Park, Chanik. et. al. "A Reconfigurable FTL (Flash Translation Layer) Architecture for NAND Flash-Based Applications." Published Jul. 2008. p. 1-11.*
Randal, "The Curious Case of: the read-retry error." Published Jun. 19, 2011.*

* cited by examiner

*Primary Examiner* — Charles Rones
*Assistant Examiner* — Hewy Li
(74) *Attorney, Agent, or Firm* — Kilpatrick Townsend & Stockton LLP

(57) ABSTRACT

A snapshot of a volume is taken by proactive uploading of scheduled snapshot data before the scheduled snapshot time has arrived. A volume snapshot schedule of once a day may be set up to a service provider using a speed-limited network connection. Using a determined upload speed of the network connection and a list of changes to the volume since a prior snapshot, a snapshot system may determine an appropriate time to start uploading volume data so that the snapshot may be completed at or after the scheduled snapshot time. By using the list of changes and available bandwidth of the network connection, the snapshot may be completed earlier than had it been started at the time of the snapshot and the available bandwidth of the network connection may be more efficiently used.

26 Claims, 11 Drawing Sheets

PREDICTIVE UPLOAD OF SNAPSHOT DATA

BACKGROUND

Many companies and other organizations operate networks that connect computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities such as businesses to provide computing resources to customers.

Some public data center operators provide network access, power and secure installation facilities for hardware owned by various customers, while other public data center operators provide "full service" facilities that also include hardware resources made available for use by their customers. However, as the scale and scope of public and private data centers have increased, the tasks of provisioning, administering, and managing the physical computing resources have become increasingly complicated.

BRIEF DESCRIPTION OF THE DRAWINGS

Various embodiments in accordance with the present disclosure will be described with reference to the drawings, in which.

DETAILED DESCRIPTION

Figure 1:
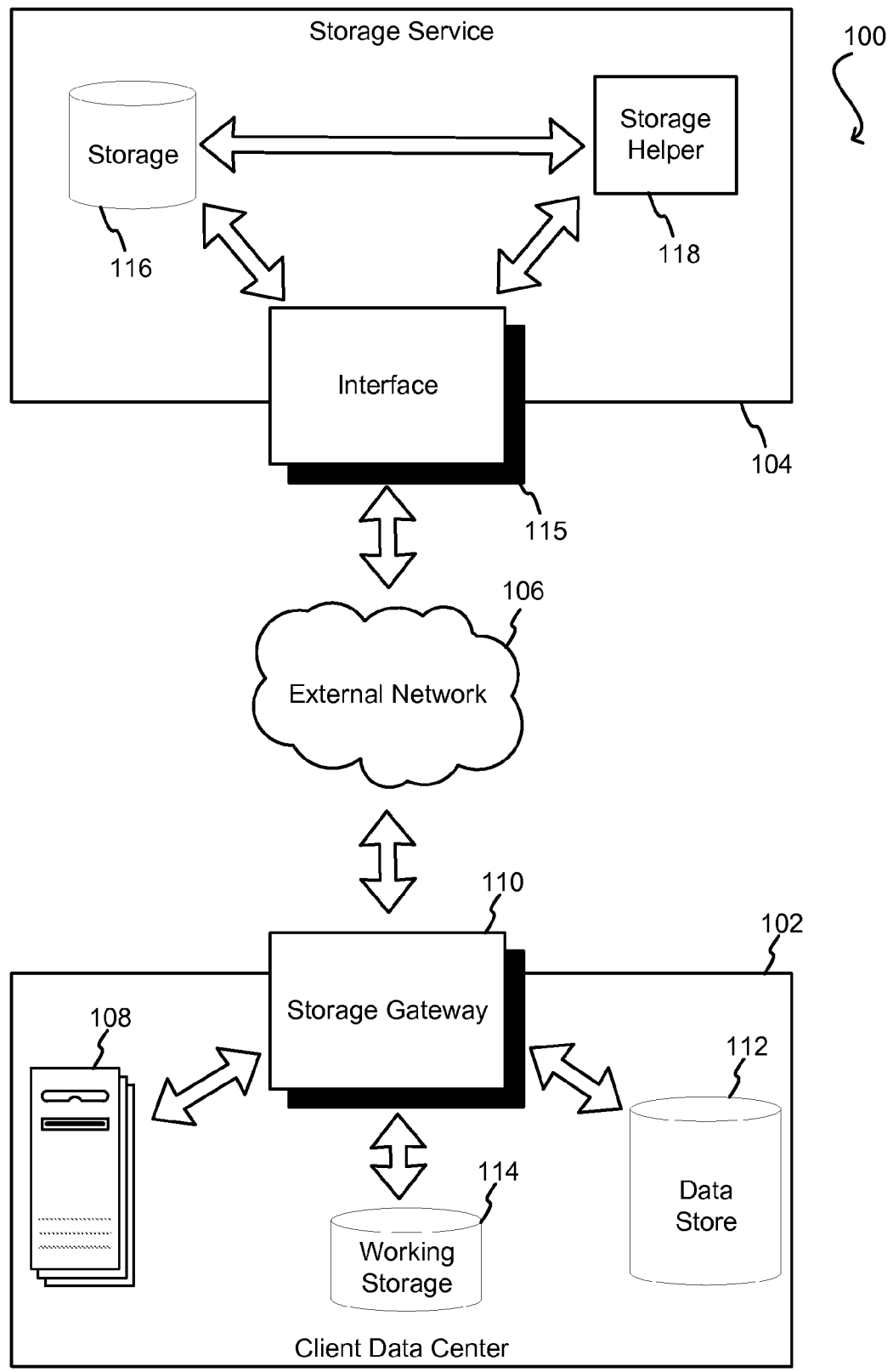
FIG. 1 shows an illustrative example of an environment in which a predictive snapshot may be implemented in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include taking a snapshot of a volume by proactive uploading of scheduled snapshot data before the scheduled snapshot time has arrived. For example, a customer may set up a volume snapshot schedule of once a day to an off-site service provider using a speed-limited Internet connection. Using a determined upload speed of the Internet connection and a list of changes to the volume since a prior snapshot, a snapshot system may determine an appropriate time to start uploading volume data so that the snapshot may be completed at or after the scheduled snapshot time. By using the list of changes and available bandwidth of the Internet connection, the snapshot may be completed earlier than had it been started at the time of the snapshot and the available bandwidth of the Internet connection may be more efficiently used.

In one embodiment, a storage appliance is placed at a customer premises. The storage appliance appears as a block storage volume to computing resources at the customer premises. The storage appliance responds to read and write requests from the client computing resources, with the read request receiving a response including the stored data and write requests storing an associated write request data. For write requests, changes to the data of the volume are stored in another data store, which may be termed the working storage. The working storage stores the changes as entries in a queue, with the queue containing at least the entries since a previous snapshot was performed. The storage appliance also interfaces with a service provider over an external network for storage of a snapshot. Using an amount of changed data reflected in the entries since the last snapshot, the amount of upload throughput available to the storage appliance may be used to determine an upload time of how long the changes will take to upload to the service provider. If the amount of upload time is equal to or more than the remaining time to the scheduled snapshot with a delay factor or a buffer factor or no factor, the storage appliance begins uploading the change data described in the entries in the working storage. Changes to already uploaded data may be re-uploaded. Once the scheduled snapshot time occurs, the working storage may mark the last entry of the snapshot. Remaining entries before and including the last entry of the snapshot may be uploaded to the service provider to finish the snapshot. For example, a storage appliance determines the time (TS) until a next snapshot, a throughput (B) to a service provider, an amount (D) of changed data to upload and two factors (K) and (L) representing delay ("postpone") or advance ("prepone") of timing. If TS<K*D/B+L, the upload of changed data may be started. In the equation shown, a K<1 represents a postponing of timing and a K>1 represents a preponing of timing. L may also be positive or negative to adjust the postponing or preponing of timing.

In some embodiments, a storage gateway may monitor changes to a data store external to the storage gateway. The data store may field the requests for read and write requests, while the storage gateway monitors the data store and/or the requests. Depending on the embodiment, a write request may be forwarded in part or in whole to the storage gateway, or the storage gateway may review the data store for changes. The storage gateway may track the changes to the data store. Upon determining the tracked changes should be uploaded to a service provider as part of a snapshot, the storage gateway may perform read requests on the tracked data and upload the tracked data to the service provider.

In some embodiments, further optimizations may be performed. In one embodiment, data collisions in the working storage may be removed from a snapshot so that only the latest change represented by an entry is uploaded to the service provider. In another embodiment, the upload may be delayed such that data collisions are given more time to be resolved before upload to improve the efficiency of the use of the upload bandwidth. In yet another embodiment, only portions of a block or object may be uploaded and the service provider may update stored information with the portion.

In some embodiments, the storage appliance and the service provider may use differing storage technologies. Conversion may be needed for the storage technologies. The conversion may occur at the client side before upload or the service provider side after upload. For example, a storage appliance uses block storage and a service provider uses object storage. In this example, optimum storage of the object store is 4 megabyte objects, while the data store uses 4 kilobyte blocks. If a service provider does not have a method to update objects, any change within a 4 megabyte object may necessitate a re-upload of the 4 megabyte object. However, if the storage service is able to update or mutate objects, only the changes to the object may be uploaded. For example, a service provider, using object storage with immutable objects, uses a storage helper that receives the update from the storage appliance. A new object is created by using an old object referenced in the update and merging the changes into the new object. A reference to the old object (as part of a snapshot) may be updated to reflect the new object.

It should be noted that a snapshot or a backup is used in some embodiments for the purpose of example clarity. However, it should be recognized that a process or system can be used for either a backup and/or a snapshot. In many embodiments in which a snapshot is discussed, a backup may also be applicable. Similarly, in many embodiments in which a backup is discussed, a snapshot may also be applicable.

Turning now to FIG. 1, an illustrative example of an environment 100 is shown, in which a predictive snapshot may be implemented in accordance with at least one embodiment. A client data center 102 is connected to a storage service 104 through an external network 106, such as the Internet or private network capacity. The client data center 102 may back up data, such as a data store snapshot, to the storage service 104 over the external network 106. The external network 106 may include limitations, such as available bandwidth or throughput.

The client data center 102 may contain multiple client computing systems 108 that store information through a storage gateway 110. The storage gateway 110 may be configured to appear as a block storage device to the client computing systems 108 such that the client computing systems 108 may read and write data to the storage gateway 110. The storage gateway 110 may store the data in a data store 112. For each write to the data store, an entry documenting the change may be stored in a second data store that may be called working storage 114. In some embodiments, the working storage is a queue that receives and/or organizes changes in order.

A snapshot may be represented in the queue as a difference between a prior snapshot and a set of entries in the working storage. For example, a prior snapshot was taken at entry number 5 in the working storage. A new snapshot is requested when the latest entry in the working storage was at entry number 20. Thus, the new snapshot should contain the prior snapshot updated with the information in entries 6 through 20. If the snapshot is remotely located, such as in a service provider 104 over an external network 106, only the changes in entries 6 through 20 need be transferred to the service provider 104 to save on expended external network 106 usage. The working storage 114 may continue to accept entries, such as entries 21 through 40, as the new snapshot is known to end at entry 20.

The storage gateway 110 may communicate with a storage service 104 through an interface 115 to the storage service 104, such as an application programming interface (API). The received data may be placed directly into storage 116 and associated with a snapshot or further processed through a storage helper 118 configured to further process incoming data. In some embodiments a storage helper 118 performs a task of linking stored data with a specific snapshot. In other embodiments, a storage helper 118 converts block data information into object data information. In yet other embodiments, a storage helper 118 creates a new object to store by updating a prior object from storage 116 with data received from storage gateway 110, reducing the amount of information transferred over the external network 106. In some embodiments, multiple storage helpers 118 are used. The storage helpers 118 may be modules, code, processes, hardware, software, plugins or other computing tools used together with, excuting on or separately from the storage service 104.

The storage gateway 110 may use the working storage information to gain an advantage in time on a future scheduled backup. The storage gateway 110 may determine a throughput of the external network 106 of data that may be transferred to the storage service 104. This determination may be performed by historical analysis, estimated load, test measurements, expected throughput or other estimation or determination of speed. The storage gateway 110 may then determine the amount of changes that must be uploaded to the storage service 104 by examining the entries in the working storage 114. The time remaining before the scheduled backup may also be determined. Using the throughput and amount of changes, a determination on the amount of time required for the transfer may be determined. If the amount of time for the transfer is equal to or less than the time remaining before the scheduled backup, the backup may be started. In some embodiments, the time remaining or time for the transfer may be further altered with a factor to postpone or prepone the start of upload to data in the working storage 114. Any uploaded data that is further changed may be replaced by a second upload of the changed data. Upon a scheduled time for the scheduled backup, the last working storage 114 entry may be noted. Further changes may be stored in the working storage 114 for further scheduled backups. However, the uploading of the remaining entries in the working storage 114 up to the last working storage 114 entry may be uploaded to make the backup complete.

Figure 2:
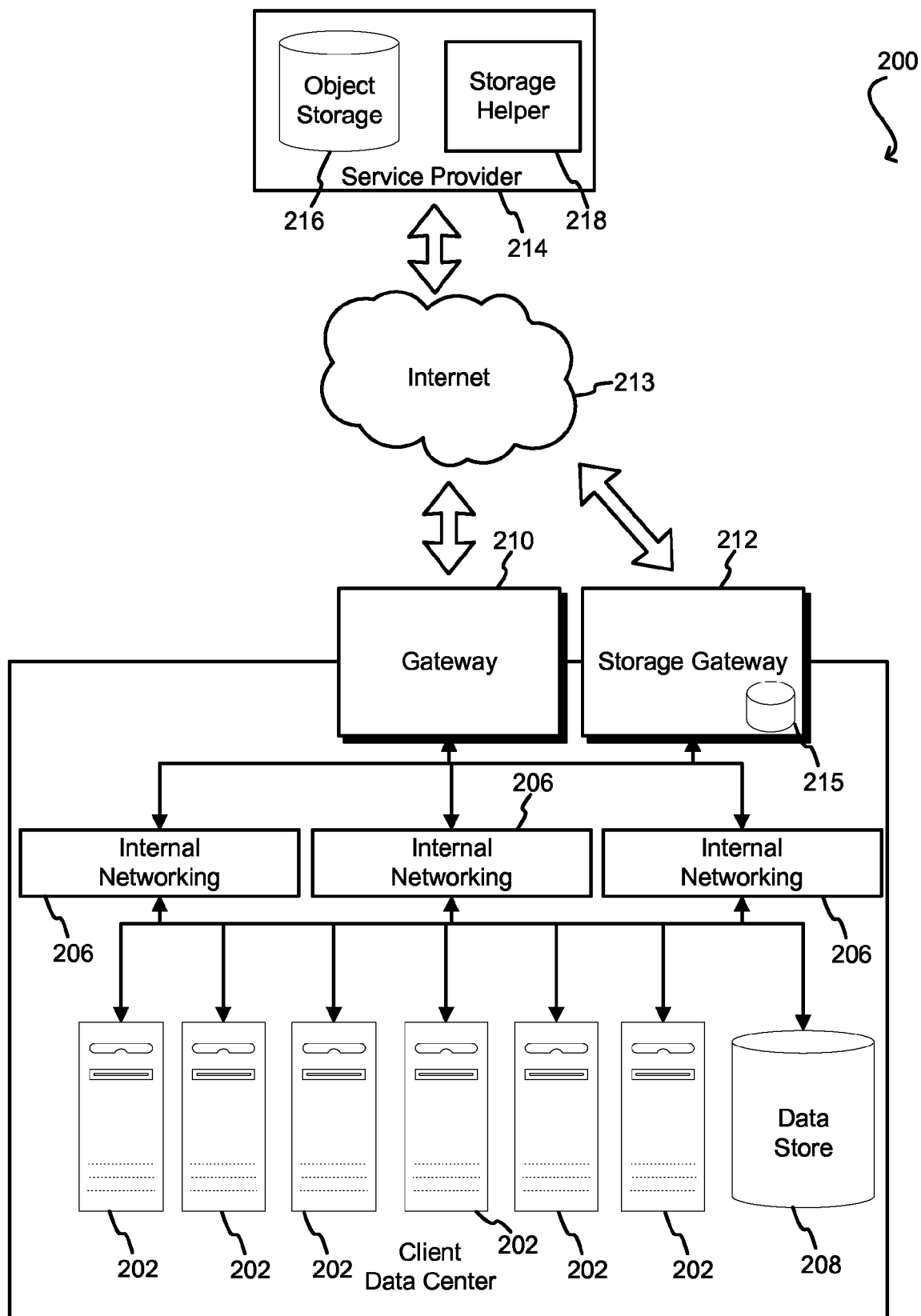
FIG. 2 shows an illustrative example of an alternate environment in which a predictive snapshot may be implemented in accordance with at least one embodiment.

Turning now to FIG. 2, an illustrative example is shown of an alternate environment 200 in which a predictive snapshot may be implemented in accordance with at least one embodiment. In the example shown, a client data center 204 is connected to a service provider 214 providing a storage service via the Internet 213. The client data center 204 may include multiple client computing resources, such as servers 202, connected through internal networking 206 to a gateway 210 to the Internet 213, a storage gateway 212 and a data store 208. The servers 202 may read and write information to the data store 208. The storage gateway 212 may receive change information about the writes to the data store 208, such as by receiving copies of the writes or by monitoring the data store 208. The storage gateway 212 may store the tracking information in entries in working storage 215 to identify changed data of the data store 208. Using the working storage, the storage gateway may determine an efficient time to start upload of the data from the data store 208 identified in the entries in working storage 215 since a last snapshot. The efficient time may include historical data, upload speed, historical loads, amount of data to upload and time remaining until a next scheduled snapshot and probabilities of data collisions in the time remaining. The data may be uploaded over a secure channel to the service provider 214. The service provider 214 may store the data as related to a snapshot in object storage 216 or further process the data through a storage helper 218 to store in object storage 216. In the example shown in FIG. 2, the data will need to be converted from block storage to object storage, as the data store 208 and object storage 216 are of different storage types. At the time of the scheduled snapshot, a last entry may be marked such that an end of the changes to upload for a snapshot is known. The storage gateway 212 may then complete the snapshot by finishing the upload of any entries not yet uploaded to the service provider 214.

Figure 3:
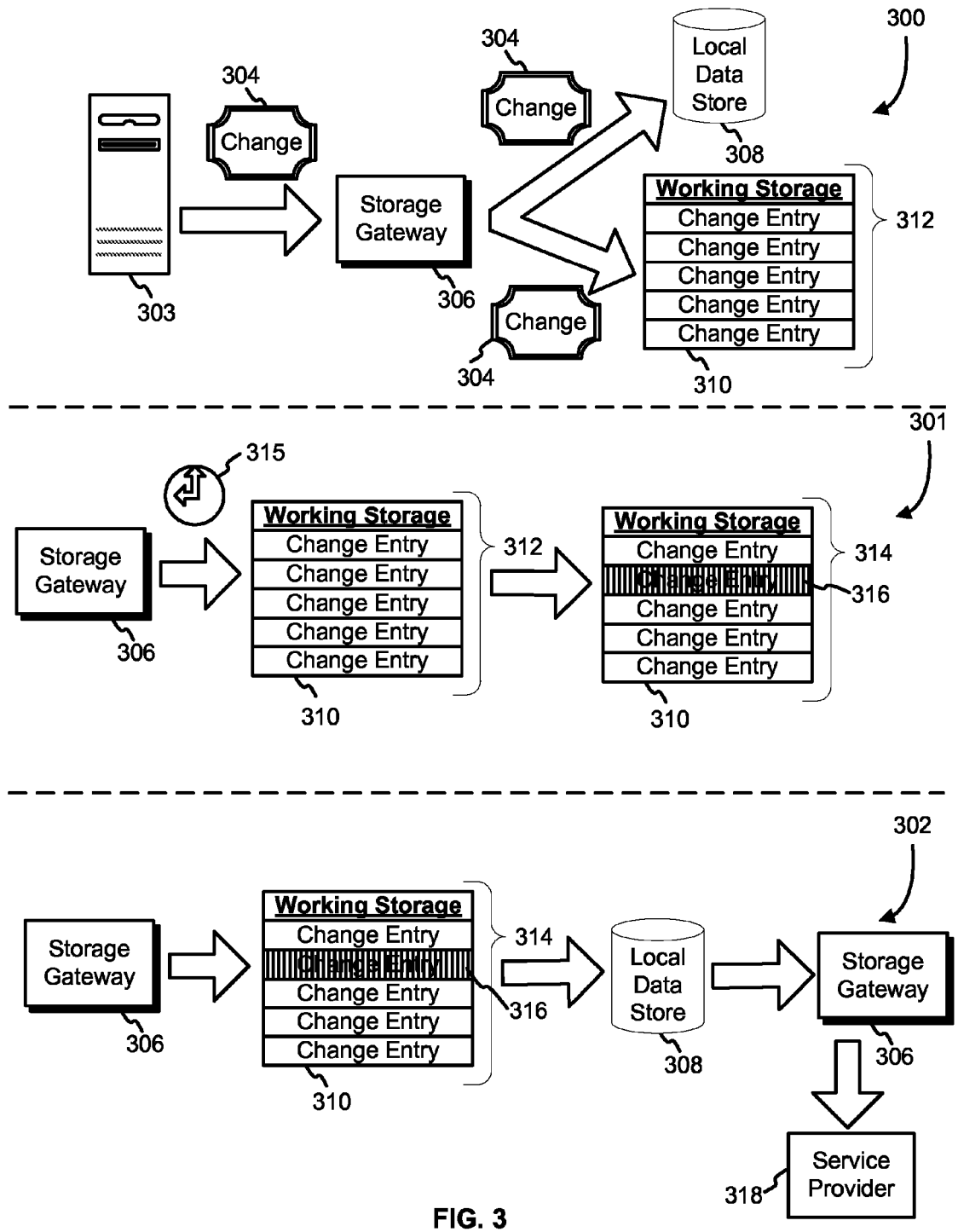
FIG. 3 shows an illustrative diagram of systems involved in a predictive snapshot in accordance with at least one embodiment.

Turning now to FIG. 3, an illustrative diagram of systems involved in a predictive snapshot in accordance with at least one embodiment is shown. The predictive snapshot may be seen as three phases, a change management phase 300, an optimization phase 301 and a transmission phase 302. The optimization phase 301 and transmission phase 302 may also operate during two stages of uploading data to a service provider 318: an upload of predictive pre-snapshot data and an upload of post-snapshot data. These phases, however, may operate at the same time and in any order. In the change management phase 300, changes are stored in working storage 312 as the changes are made to a local data store 308. A client computing resource 303, such as a server process, sends a change 304, such as a write request, to a storage gateway 306. The storage gateway 306 causes the change 304 to be written to the local data store 308 and the working storage 312 as a change entry 310. In some embodiments, the change entry 310 includes the changed data. In other embodiments, the change entry 310 is a reference to the local data store 308.

The local data store may prevent the overwriting of information that is in a closed snapshot but that is not yet uploaded to the service provider 318. An open snapshot may be represented by entries in a working storage 312 that form part of a future snapshot. A closed snapshot may be represented by entries in a working storage 312 that form part of a past snapshot and occur before or at a last entry of the snapshot. The snapshot may close at or near the time of the scheduled snapshot. Closing the snapshot may be based at least in part on the time of the scheduled backup, which may mean that the time is selected from a set of times that is limited by the scheduled time (e.g. it has to be within 2 hours of the scheduled time). In one embodiment, changes that would affect an entry in the working storage 312 that forms part of a closed snapshot may be stored in a journal that is applied after the uploading of the snapshot is complete. For example, a write request is received from a client server to the storage gateway 306. The storage gateway 306 may review the working storage 312 to see if the location of the write is protected by an entry that is part of a closed snapshot. If not, the write may occur. If the write is protected by an entry, the entry may be stored on a journal to be applied after the snapshot upload is complete. In another embodiment, changes to the local data store 308 are directly stored in the working storage, such that any changes to the local data store 308 may be immediately applied. In yet another embodiment, a link between working storage entry and a set of local storage blocks is created where the local storage blocks are marked dirty along with latest working storage entry that corresponds to the local storage block. When a working storage entry is processed and uploaded, the corresponding local storage blocks that don't have any other later updates will be marked 'clean.' In some cases, the local store may not have all the data such as when the local store is operating in a caching mode.

The uploading of data to the service provider 318 can be separated into two stages of uploading. The first stage is a predictive pre-snapshot upload in which data predicted to be in a future snapshot is proactively uploaded before the snapshot is taken. The second stage is an upload of data that forms part of snapshot request in the past. The two phases are separated by the scheduled snapshot request. Predicting which data will form part of a future snapshot is useful during the first stage. The prediction process may be optimized by determining a probability that an entry 310 will be overwritten in the remaining time before the snapshot is taken. In some embodiments, the entries 310 are prioritized for upload based on the smallest probability first (or the greatest probability of not being overwritten). In other embodiments, entries 310 that fail to meet or exceed a probability threshold are skipped and entries 310 that meet or exceed a probability threshold are included in the upload before the snapshot is taken. On the other hand, in the second stage of upload, all data forming the snapshot (such as those identified by the write log) must be uploaded to the service provider 318 in order to consider the snapshot complete.

As part of the two stages of uploading, the uploading may be accomplished by an optimization phase 301 and a transmission phase 302. In the optimization phase 301, a determination is made of which data to transmit to the service provider 318 at what point in time. In the embodiment shown, a storage gateway 306 determines a time 315 to begin uploading data. This time 315 may be based on factors that include network speed, time remaining until a scheduled snapshot and an amount of data to transmit over the network. The working storage 312 may be examined for data collisions. A data collision is an overwrite of a prior write to a data store. Colliding entries 316 may be removed from the working storage 312 and the last entry 310 may be selected, as long as the colliding entry is completely overwritten.

In the transmission phase 302, snapshot data is transmitted to the service provider 318 according to the determinations made in the optimization phase. The storage gateway 306 uploads information from the working storage 314 according to optimizations from the optimization phase 301. Here, colliding entries 316 are skipped because of the optimzation performed in the optimization phase 301. Entries other than the colliding entries 316 are retrieved from the local data store 308 and sent by the storage gateway 306 to the service provider 318 over a communication channel. Communications channels may include secure or insecure HTTP, HTTPS, FTP, TCP, IP, ethernet, token ring, RS232 or other communications technology hardware and/or software.

Figure 4:
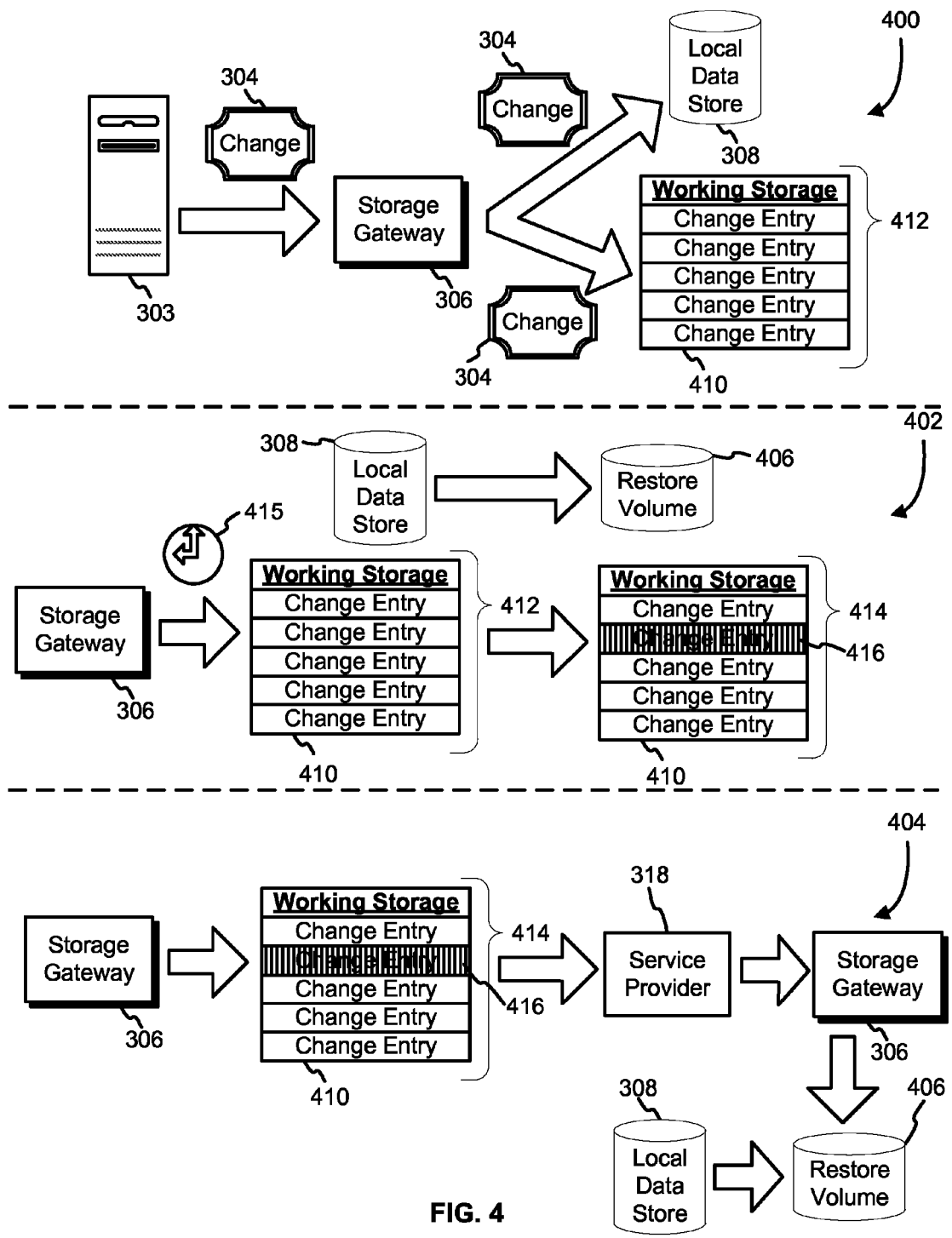
FIG. 4 shows an illustrative diagram of systems involved in a predictive restore in accordance with at least one embodiment.

Turning now to FIG. 4, an illustrative diagram of systems involved in a predictive restore in accordance with at least one embodiment is shown. In one embodiment, the predictive restore may be used to synchronize a remote volume to a snapshot that is not yet complete. The predictive restore may cause data from a predictive snapshot to be proactively sent to a remote volume before a snapshot is taken such that the predictive restore may complete faster than if the restore happened after the snapshot was taken. The predictive restore may be seen as three phases, a change management phase 400, an optimization phase 402 and a transmission phase 404. These phases, however, may operate at the same time and in any order. In the change management phase 400, changes are stored in working storage 412 as the changes are made to a local data store 308. A client computing resource 303, such as a server process, sends a change 304, such as a write request, to a storage gateway 306 to cause the change 304 to be written to the local data store 308 and the working storage 412 as a change entry 410.

In the optimization phase 402, a determination is made of which data to send to the service provider 318 and restore volume 406 at what point in time. The information will not only be uploaded to the service provider 318, but also the restore volume 406. In the embodiment shown, a storage gateway 306 determines a time 415 to begin uploading data to the service provider 318 and the restore volume 406. This time 415 may be based on factors that include network speed, time remaining until a scheduled restore and an amount of data to transmit over the network. The working storage 412 may be examined for data collisions. A data collision is an overwrite of a prior write to a data store. Colliding entries 416 may be removed from the working storage 412 to form non-colliding working storage 414 and the earliest change entry 410 selected, as long as the colliding entry is completely overwritten.

In the transmission phase 404, snapshot data is uploaded to the service provider 318 and restore volume 406 according to the determinations made in the optimization phase. Prior snapshot information from the data store 308 may be copied to the restore volume 406. The storage gateway 306 uploads information from the working storage 414 according to optimizations from the optimization phase 402. Here, colliding entries 416 are skipped because of the optimization performed in the optimization phase 402. Entries other than the colliding entries 416 are retrieved from the local data store 308 and uploaded by the storage gateway 306 from the service provider 318 over a communication channel. Communications channels may include secure or insecure HTTP, HTTPS, FTP, TCP, IP, ethernet, token ring, RS232 or other communications technology hardware and/or software. The storage gateway 404 receives the data and applies the data to the restore volume 406.

In another embodiment, this mechanism of predictive restore is part of asynchronous replication between two remote volumes. A second volume is updated via 'commit points' or 'snapshot points' from a first volume. The second volume is updated on a continuous basis such that each snapshot point from the first volume is restored onto the second volume in less time than if the entire snapshot were transferred between the volumes after the snapshot was taken. In some cases, a snapshot may complete transfer approximately at the same time snapshot is taken.

Figure 5:
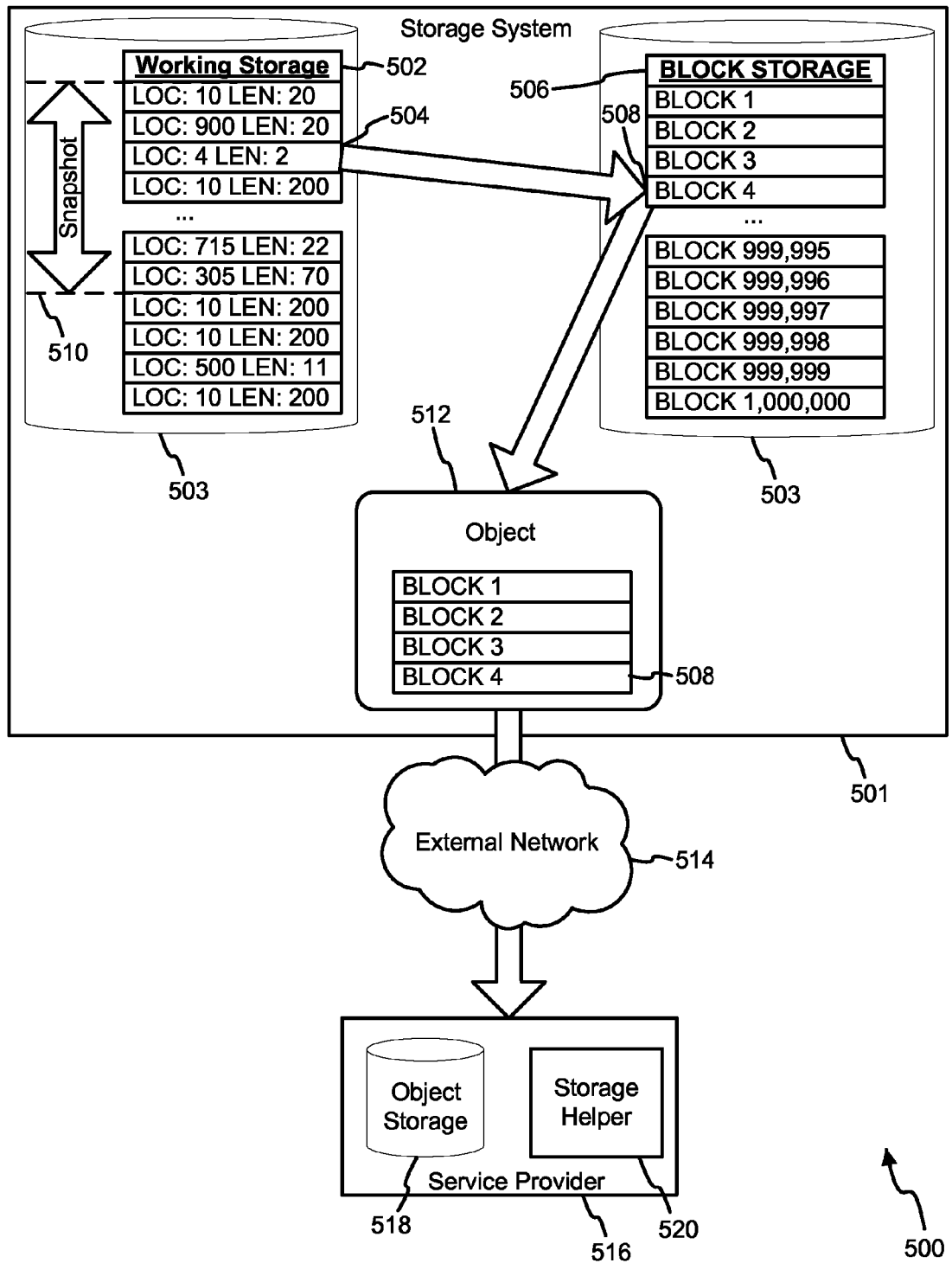
FIG. 5 shows an illustrative example of an environment in which a predictive snapshot is used with a block storage system and an object storage system in accordance with at least one embodiment.

Turning now to FIG. 5, FIG. 5 shows an illustrative example of an environment 500 in which a predictive snapshot is used with a block storage system and an object storage system in accordance with at least one embodiment. A storage system 501 tracks changes to block storage 506 using a working storage 502. The working storage 502 and block storage 504 may be built upon a storage system 503, such as a hard drive, solid state storage, virtual storage system, database or other storage technologies. The working storage 502 includes entries 504 identifying changes to the block storage 506 in the order the changes were accomplished. A snapshot 510 is represented by a grouping of changes to the block storage since a prior snapshot.

The storage system 501 may compile information to send as part of a snapshot to a service provider 516. In the embodiment shown, the service provider 516 uses object-based storage 518, but does not have a storage helper 520 based for conversion from block storage 506. The storage system 501 retrieves an entry 504 from the working storage 502 and retrieves necessay information from the block storage 506 to compile an object 512 for storage with the service provider 516. The object 512 is sent over an external network 514 to the service provider 516 for storage. For example, in the embodiment shown, the entry 504 identifies a change at block location 4 for a length of 2 blocks. As an object is four blocks and always starts at a boundary of four, the object is created by retrieving blocks 1-3 and the modified 4 block 508. The object 512 is then sent to the service provider 516.

Figure 6:
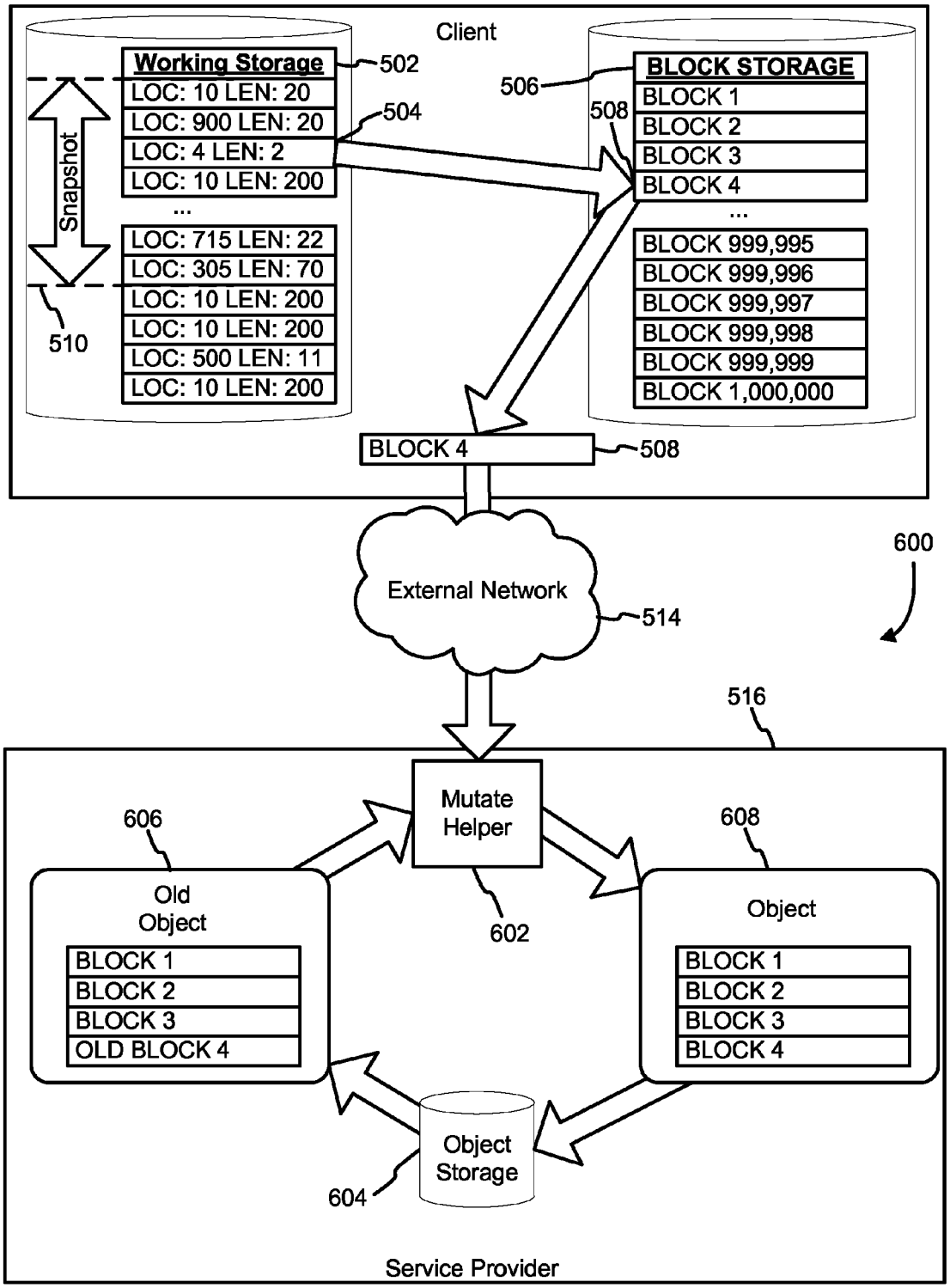
FIG. 6 shows an illustrative example of an environment in which a predictive snapshot is used with a block storage system to mutate an object within an object storage system in accordance with at least one embodiment.

Turning now to FIG. 6, FIG. 6 shows an illustrative example of an environment 600 in which a predictive snapshot is used with a block storage system to mutate an object within an object storage system in accordance with at least one embodiment. As seen in FIG. 5, the working storage 502 tracks changes of the block storage 506 in order to create a snapshot 510. However, if the service provider 516 has a mutate helper 602, only block 4 (508) is retrieved and sent over the external network 514. The mutate helper 602 requests an old object 606 containing the old block 4 from the object storage 604. The mutate helper 602 then creates an object 608 to hold the old object blocks 1-3 and the current block 4 (508). The object 608 is then stored in object storage 604 as associated with the new snapshot. This mutate help 602 allows for a reduction in the amount of redundant data transferred over the external network 514.

In another embodiment, a smaller object may be created with metadata instructing that changes in the smaller object be applied to a prior larger object. For example, a change to a prior object is stored as a new object with a corresponding change in metadata to reflect that the new object is now included in the volume as applied to the prior object. This allows a system to create a strongly consistent data store from eventually consistent data stores such as object data stores.

Figure 7:
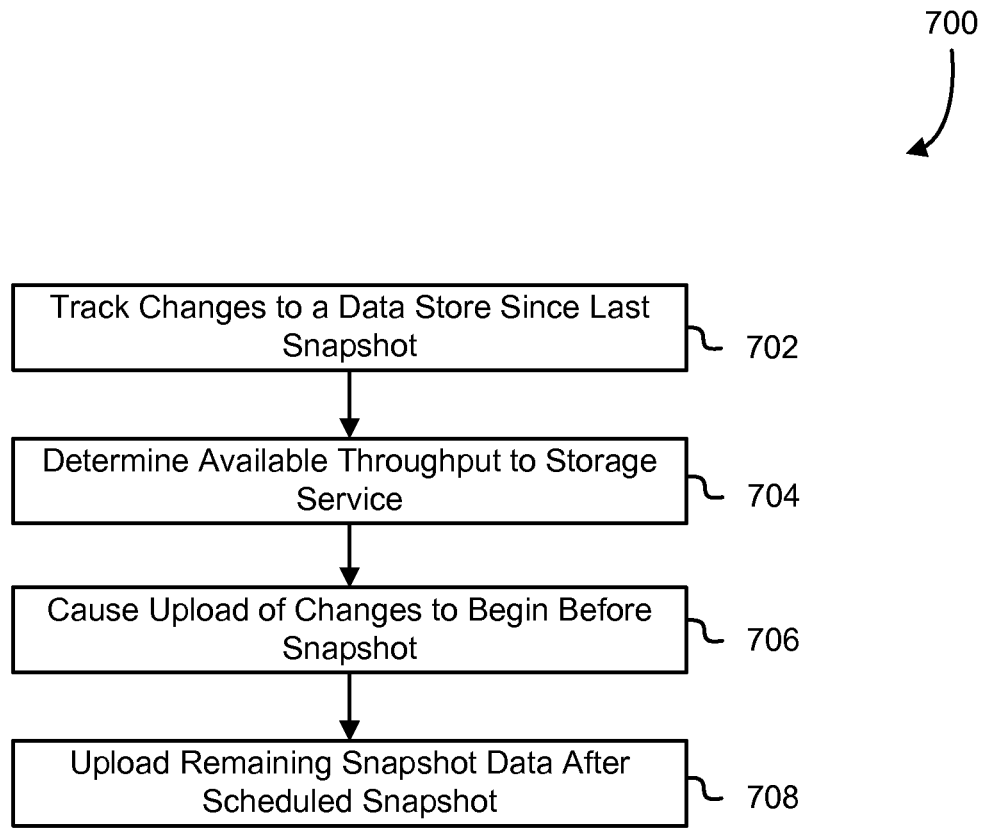
FIG. 7 shows an illustrative example of a process that may be used to perform a predictive snapshot in accordance with at least one embodiment.

Turning now to FIG. 7, an illustrative example of a process 700 that may be used to perform a predictive snapshot in accordance with at least one embodiment is shown. The process may be performed by a system such as seen in FIG. 1, including a storage service 104, a storage gateway 110, data store 112 and working storage 114. The storage gateway 110 may track 702 changes to a data store 112 since a last snapshot and determine 704 available throughput to a storage service 104. Using the available throughput and a scheduled snapshot time, the storage service 104 may cause 706 an upload of the changes to the data store 112 to begin before a scheduled snapshot. After the time of the scheduled snapshot, remaining changes to the data store 112 may be uploaded 708 to complete the snapshot. By leveraging the prior snapshot and changes since the snapshot to the data store 112, the bandwidth and time used to upload the changed data to the storage service 104 may be reduced as compared to upload of a full snapshot.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
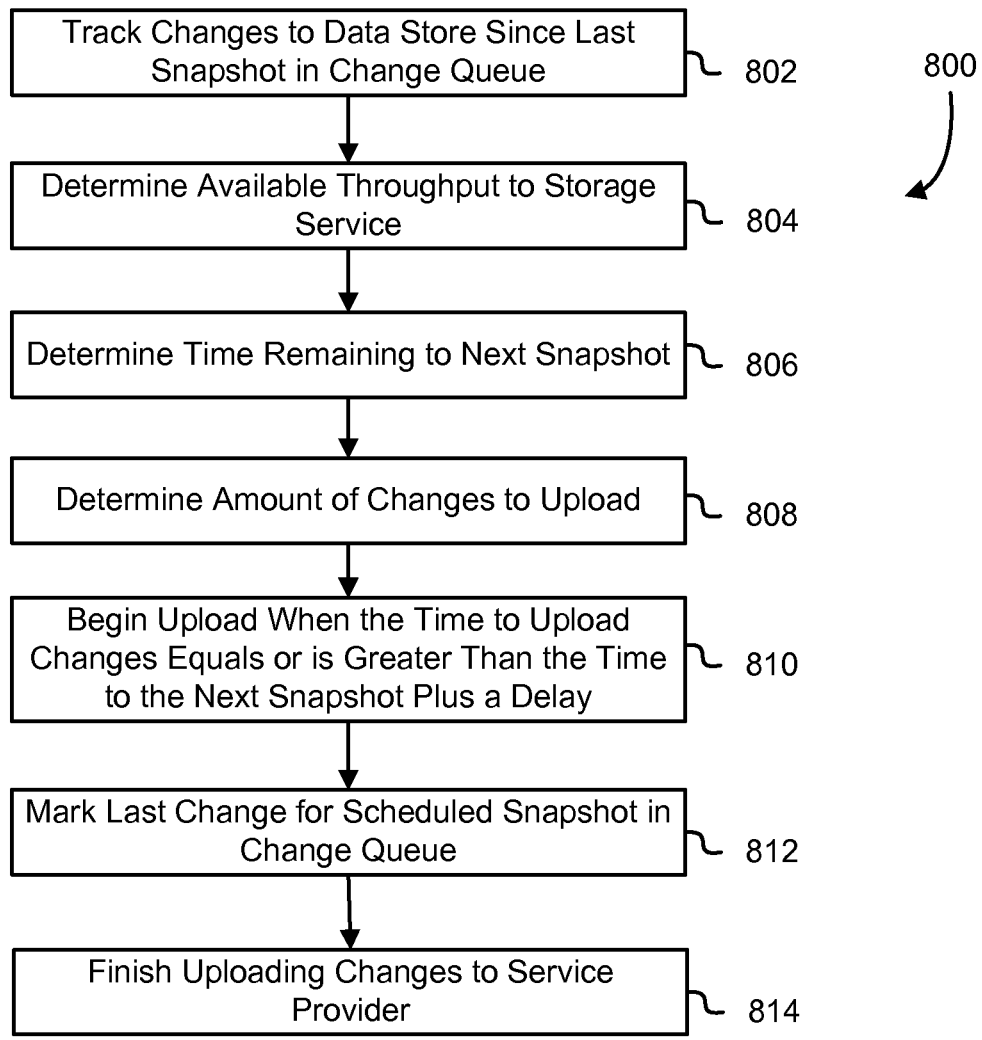
FIG. 8 shows an illustrative example of a process that may be used to perform a predictive snapshot upload based at least in part on a time to upload changes in accordance with at least one embodiment.

Turning now to FIG. 8, an illustrative example is shown of a process 800 that may be used to perform a predictive snapshot upload based at least in part on a time to upload changes in accordance with at least one embodiment. The process may be performed by a system such as seen in FIG. 1, including a storage service 104, a storage gateway 110, data store 112 and working storage 114. The storage gateway 110 may track 802 changes to a data store 112 since a last snapshot and determine 804 available throughput to a storage service 104. The storage gateway 110 may also determine 806 a time remaining until a next snapshot. Using the working storage 114, the storage gateway 110 may determine an amount of changes needed to be uploaded 808 to the storage service 104. Using the determined throughput, remaining time and amount of changes, the storage gateway 110 may begin 810 the upload of changes to the data store when the time required for the upload equals or is greater than the time to the next snapshot plus or minus a delay. This allows the storage gateway 110 to "get a head start" on the uploading of changes to the data store that make up the snapshot so that the snapshot may be marked as completed more quickly. This proactive uploading also allows the storage gateway 110 to make use of potentially expensive upload bandwidth that would be potentially wasted if not used. The upload bandwidth of the storage gateway 110 to the storage service 104 is potentially more expensive because longer distance communications are often slower and more expensive than short distance, local communications. When the time for the snapshot arrives, the last change or entry in the working storage 114 may be marked 812. The changes may be uploaded 814 to the storage service 104 until the snapshot is complete. Once the marked entry is uploaded along with the other changes between the prior snapshot last entry and the marked entry, the snapshot is complete.

Figure 9:
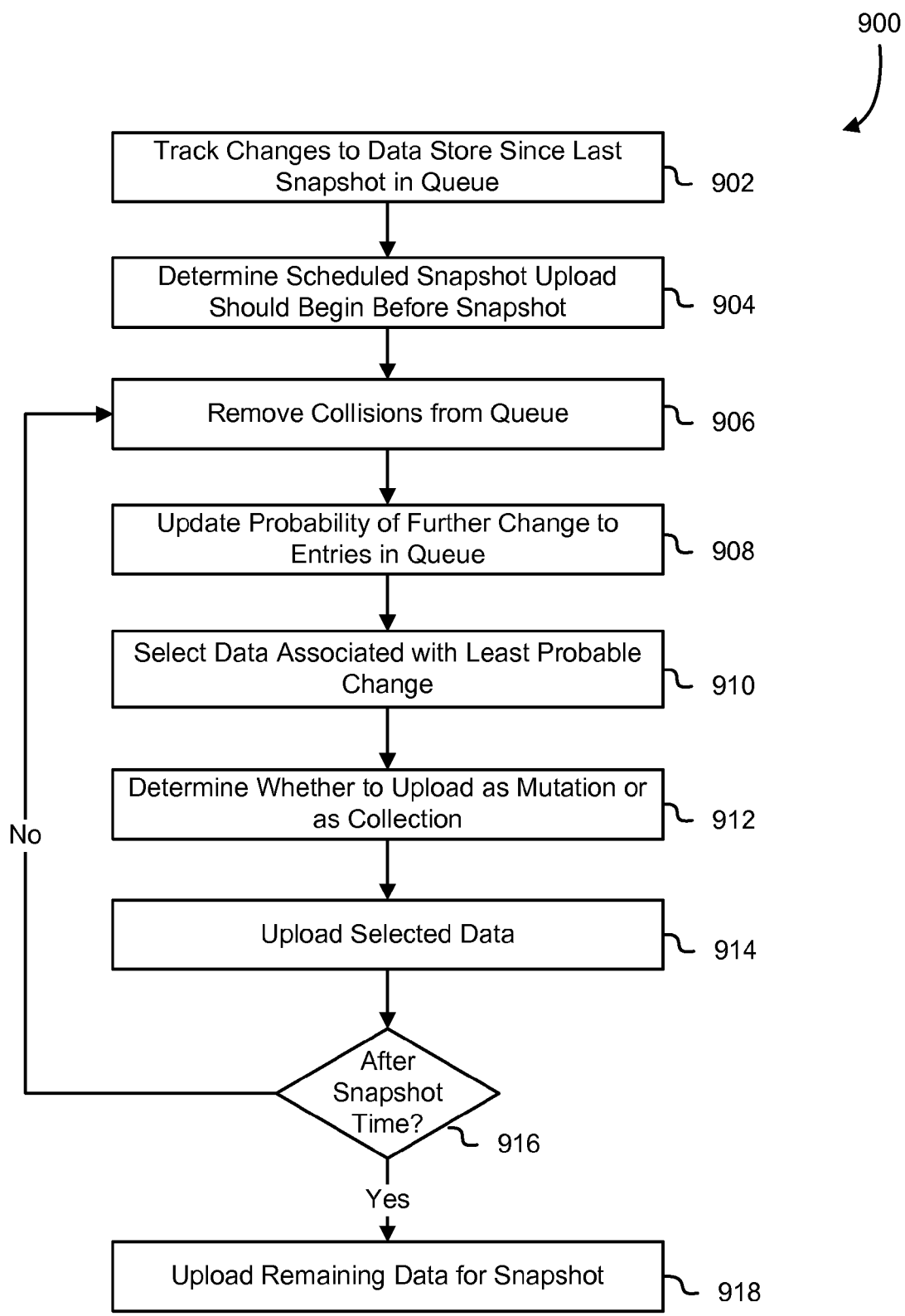
FIG. 9 shows an illustrative example of a process that may be used to perform a predictive snapshot based at least in part on predicted collisions in accordance with at least one embodiment.

Turning now to FIG. 9, an illustrative example is shown of a process 900 that may be used to perform a predictive snapshot based at least in part on predicted collisions in accordance with at least one embodiment. The process may be performed by a system such as seen in FIG. 1, including a storage service 104, a storage gateway 110, data store 112 and working storage 114. The storage gateway 110 may track 902 changes to a data store 112 since a last snapshot. Using information such as the available throughput and a scheduled snapshot time, the storage service 104 may cause 904 an upload of the changes to the data store 112 to begin before a scheduled snapshot. Optimizations may be made such as removing collisions from the queue 906 in the working storage 114. The storage gateway 110 may determine 908 a probability that each entry will be overwritten before the snapshot is closed. Using these probabilities, such as computed by a "heat map" technique, the data associated with the least probability of change may be selected to be uploaded first 910 to avoid a re-upload of data that is overwritten. If possible, the amount of data sent to the storage service 104 over the external network is minimized by determining 912 to send only the changed data as a mutation to data existing in the storage service 104; otherwise a collection may be determined to be sent. The selected data is then sent 914 to the storage service 104. If the scheduled snapshot time has not yet arrived 916, the process may be repeated starting at 906 using the steps to update information as necessary (such as step 908 if a collision has occurred). Once the snapshot time passes 916, the remaining data for the snapshot may be uploaded 918 according to the working storage 114.

Figure 10:
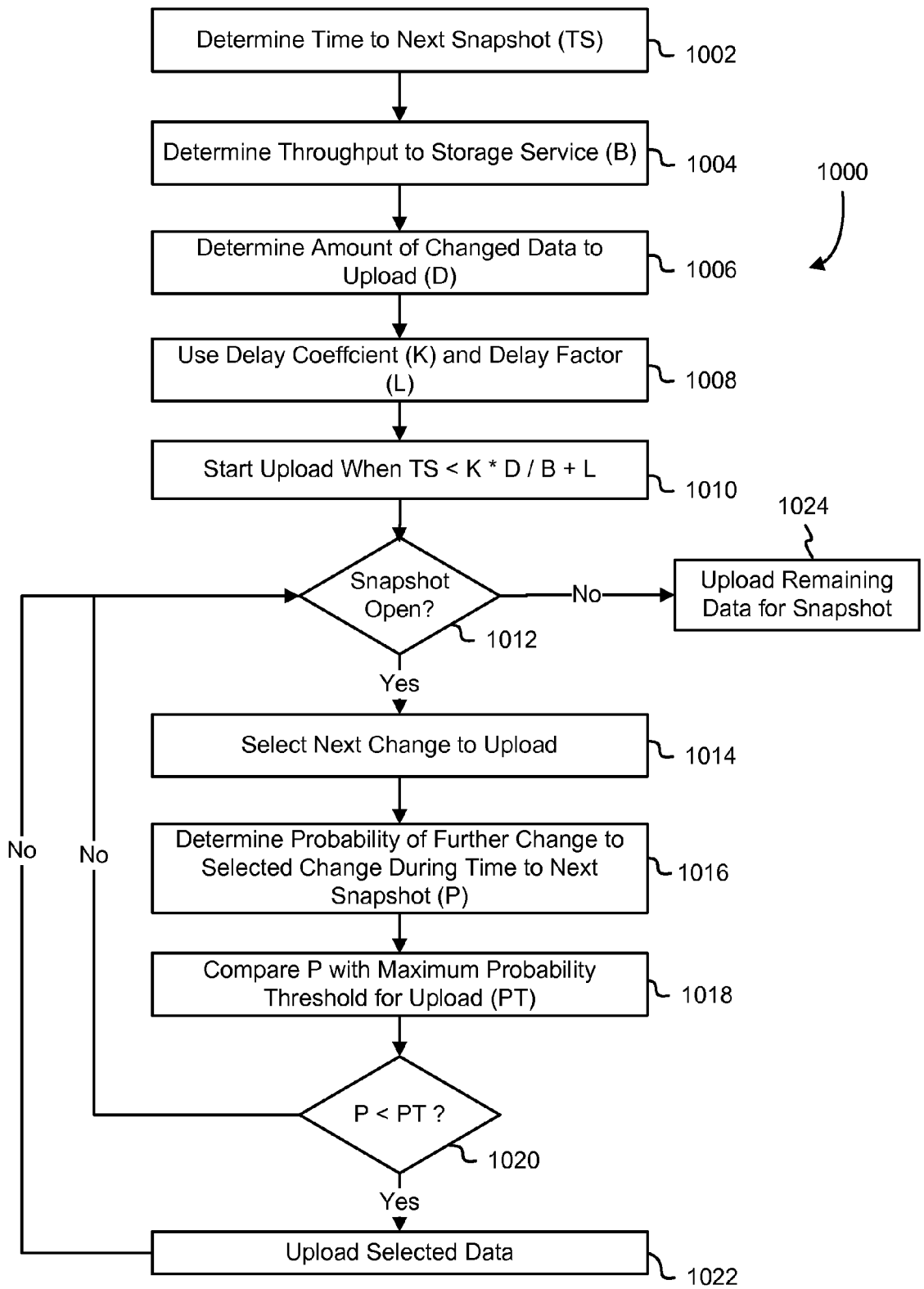
FIG. 10 shows an illustrative example of a process that may be used to perform a predictive snapshot by prioritizing uploads in accordance with at least one embodiment.

Turning now to FIG. 10, an illustrative example is shown of a process 1000 that may be used to perform a predictive snapshot by prioritizing uploads in accordance with at least one embodiment. The process may be accomplished by a system such as seen in FIG. 1, including a storage service 104, a storage gateway 110, data store 112 and working storage 114. The storage gateway 110 may still track changes to a data store 112 since a last snapshot. The storage gateway 110 may determine 1002 a time remaining until a next snapshot ("TS"). The storage gateway 110 may determine 1004 available throughput to a storage service 104 ("B"). Using the working storage 114, the storage gateway 110 may determine 1006 an amount of changes needed to be uploaded to the storage service 104 ("D"). Using 1008 a delay coefficient ("K") and a delay factor ("L"), the determined throughput B, remaining time TS and amount of changes D, the storage gateway 110 may begin 1010 the upload of changes to the data store when TS<K*D/B+L (or the time required for the upload adjusted by the delay coefficient and delay factor is greater than the time to the next snapshot). If the upload of the scheduled snapshot has started, but the snapshot is 1012 still open (the time for the scheduled snapshot has not yet arrived), a next change identified in the working storage 114 may selected for upload 1014. The next change may be examined to determine 1016 the probability that the change will be overwritten in the remaining time to the next snapshot (P). Using 1018 the maximum acceptable probability threshold for upload (PT), the storage gateway 110 determines 1020 if P<PT. If so, the data is uploaded 1022. If not, the data is skipped and the working storage 114 is checked to see if the snapshot is still open 1012. If the snapshot is 1012 still open 1012, the process of 1014-1022 may be repeated. If the snapshot is 1012 closed, the remaining data for the snapshot is uploaded to the storage service 1024.

Figure 11:
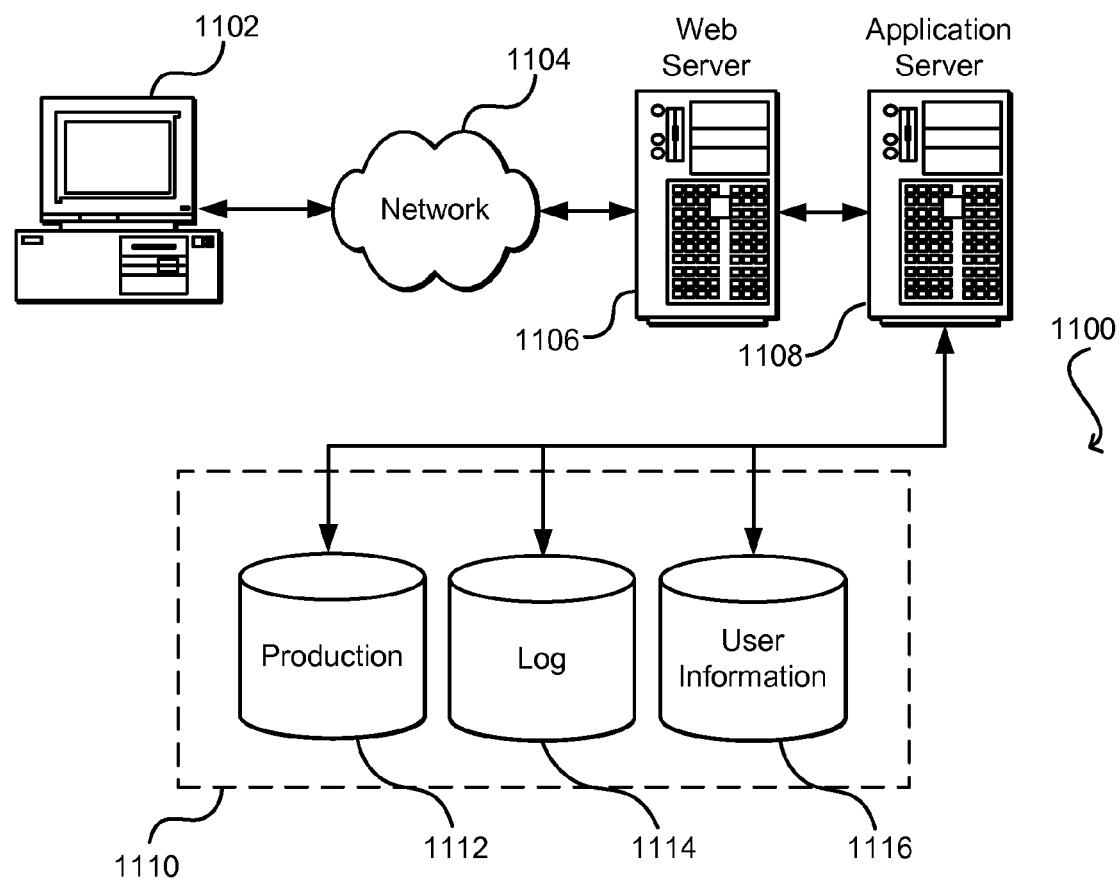
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for data backup, comprising:
    tracking using a list of writes, a set of changes to a volume to synchronize with a remote storage system, the set of changes reflecting an amount of data to upload to the remote storage system, the list of writes stored on another volume;
    determining, by a computer system, a start time to begin upload of the data identified by the set of changes before a scheduled time of a snapshot of the volume, the start time based at least in part on throughput to the remote storage system over a network, the amount of the identified data to upload reflected in the set of changes, and an amount of time remaining before the scheduled time;
    forming a set of changes without collisions by removing changes from the set of changes that are overwritten by a later change before the scheduled time based at least in part on the list of writes;
    starting an upload from the volume of reduced data represented by the set of changes without collisions to the remote storage system before the scheduled time and after the start time, the reduced data determined based at least in part on the list of writes and the start time;
    in accordance with the scheduled time, closing the snapshot to new changes to the volume by determining the last change to the volume from the set of changes to complete the snapshot based at least in part on the list of writes and by associating the new changes with another snapshot of the volume in the list of writes; and
    after the scheduled time, completing the snapshot by uploading remaining reduced data that remains to be sent as part of the snapshot from the volume to the remote storage system based at least in part on the list of writes.

2. The computer-implemented method of claim 1, wherein the remote storage system is object-based and the volume is block-based storage, the method further comprising:
   causing one or more contiguous blocks of the volume to be stored as an object in the remote storage system, at least a portion of the contiguous blocks identified in the set of changes.

3. The computer-implemented method of claim 2, further comprising:
   uploading a new portion of a remote object identified in the set of changes to cause the remote object to be mutated to replace an old portion of the object with the new portion.

4. The computer-implemented method of claim 2, further comprising:
   uploading a new portion of a remote object identified in the set of changes to cause a new object to be formed, the new object associated with metadata identifying that the new object overwrites a portion of the old object.

5. The computer-implemented method of claim 1, further comprising:
   determining an order of upload of changes from the set of changes based at least in part on a probability that a change will be further modified.

6. The computer-implemented method of claim 1, wherein closing the snapshot to new changes further comprises:
   determining an entry in the list of writes that represents an end of the snapshot.

7. The computer-implemented method of claim 6, further comprising:
   adding changes to the list of writes after the determined entry for use with a next scheduled snapshot.

8. A computer-implemented method for data transfer, comprising:
   tracking a set of changes to a volume since a prior backup of data, the set of changes tracked in another volume;
   determining, by a computer system, a start time to begin sending data identified by the set of changes to storage before a scheduled time of a backup of the volume, the start time based at least in part on estimated throughput of sending the identified data to the storage, an amount of identified data to send to the storage, and an amount of time remaining before the scheduled time;
   before the scheduled time and after the start time, sending from the volume at least a subset of the identified data to be stored as part of the backup, the subset determined based at least in part on the tracking of the set of changes and the start time;
   at the scheduled time, closing the backup to new changes to the volume by determining a last change in the set of changes to make the backup complete; and
   after the scheduled time, completing the backup by sending, from the volume, remaining identified data that remains to be sent as part of the backup to the storage.

9. The computer-implemented method of claim 8, wherein the storage is a remote volume asynchronously replicating the volume by receiving the data from the scheduled backup.

10. The computer-implemented method of claim 8, further comprising:
    identifying in each change entry a location within the volume and an amount of data changed; and
    removing from the set of changes one or more collisions, the collisions identified by one or more change entries as earlier changes to the volume that are overwritten by a later change as reflected by the one or more entries affecting a same location.

11. The computer-implemented method of claim 8 further comprising determining a queue size based at least in part on bandwidth to the storage and an estimated bandwidth savings by delaying an upload of the identified data to reduce change collisions between sent changes and unsent changes.

12. The computer-implemented method of claim 8, further comprising:
    wherein the storage is object-based storage and the volume is block-based storage;
    causing one or more contiguous blocks of the volume to be stored as an object in the storage.

13. The computer-implemented method of claim 12, further comprising:
    causing a first object to be stored in the storage, the object comprising data from a block of the volume;
    modifying the block of the volume;
    sending the modified block to the storage; and
    causing a new object to be formed with the modified block and metadata identifying the application of the new object to the first object.

14. A computer system for performing backup, comprising:
    one or more computing resources having one or more processors and memory including executable instructions that, when executed by the one or more processors, cause the one or more processors to implement at least:
        a volume configured to contain volume data that is associated with a scheduled backup of the volume to a remote storage system;
        a network interface configured to connect the computer system to the remote storage system;
        a change monitor configured to identify modified data by tracking a set of changes to the volume data since a prior backup of data to the remote storage system, the set of changes tracked in another volume; and
        a backup system configured to:
            determine a start time to begin sending modified data represented by the set of changes from the volume to the remote storage system as part of the scheduled backup,
            send from the volume at least a subset of the modified data over the network before the scheduled backup to be stored as part of the scheduled backup,
            close the scheduled backup to new changes to the volume by determining a last change in the set of changes that makes the scheduled backup complete, and
            complete the scheduled backup by sending from the volume remaining modified data identified by the set of changes that remain to be sent, wherein the subset of the modified data is determined based at least in part on the tracking of the set of changes and the start time, and wherein the start time is based at least in part on estimated throughput of the network, an amount of changes to send over the network to the remote storage system, and an amount of time remaining before the scheduled backup.

15. The computer system of claim 14, further comprising the remote storage system that restores the scheduled backup onto a second volume using the modified data from the scheduled backup.

16. The computer system of claim 14, further comprising the remote storage system that receives modified data from the backup system over the network to form the scheduled backup of the volume.

17. The computer system of claim 16, wherein the remote storage system further comprises an object storage system;

wherein the volume further comprises a block storage system; and wherein the backup system further comprises a block-to-object translation system that combines one or more contiguous blocks of the volume to form an object to be stored in the remote storage system.

18. The computer system of claim 17, wherein the remote storage system further comprises a mutation system that receives an object identifier and a new portion of an object and mutates the object by replacing an old portion of the object with the new portion of the object.

19. The computer system of claim 14, wherein the change monitor further comprises tracking storage having one or more change entries, each change entry identifying a location and a size of a change to the volume data.

20. The computer system of claim of claim 19, wherein the volume, change monitor and backup system form part of a computer system at a client location and the remote server is located at a data center operated by a service provider.

21. One or more non-transitory computer-readable storage media having collectively stored thereon executable instructions that, when executed by one or more processors of a computer system, cause the computer system to at least:
- track a set of changes to a volume since a prior backup of data from the volume, the set of changes tracked in another volume;
- determine a start time to begin sending data identified by the set of changes to storage as part of a scheduled backup, the start time based at least in part on estimated throughput of sending the identified data to the storage, an amount of identified data to send to the storage, and an amount of time remaining before the scheduled backup;
- before the scheduled backup:
  - send from the volume at least a subset of the identified data to be stored as part of the scheduled backup to the storage; and
  - send at least a portion of the subset of the identified data to a remote data store associated with the storage to prepare the remote data store for synchronization with the scheduled backup, the portion of the subset determined based at least in part on tracking the set of changes and the start time;
- at a time that is based at least in part on the time of the scheduled backup, close the scheduled backup to new changes to the volume by determining a last change in the set of changes to make the backup complete;
- complete the scheduled backup by sending from the volume remaining identified data that remains to be sent to the storage; and
- complete the synchronization of the scheduled backup to the remote data store by sending remaining data from the scheduled backup to the remote data store.

22. The computer-readable storage media of claim 21, wherein the instructions further comprise instructions that, when executed, cause the computer system to at least:
retransmit the data set to storage to the remote data store.

23. The computer-readable storage media of claim 22, wherein the instructions further comprise instructions that, when executed, cause the computer system to at least:
pre-load the remote data store with a backup prior to the scheduled backup.

24. The computer-readable storage media of claim 21, wherein the computer system is a storage gateway installed within a customer data center and wherein the storage is a storage service remote from the customer data center and provided by a service provider.

25. The computer-implemented method of claim 1, wherein starting the upload comprises:
- determining an order of the upload of the reduced data based at least in part on a probability of changes before the scheduled time to the reduced data, the order further indicative of a subset of the reduced data to be uploaded after the start time and before the scheduled time; and
- uploading the subset of the reduced data after the start time and before the scheduled time based at least in part on the order.

26. The computer-implemented method of claim 1, wherein the start time is determined based at least in part on a comparison of the amount of time remaining to a time computed using the throughput and the amount of identified data adjusted by a delay parameter.

* * * * *